(12) United States Patent
Chen

(10) Patent No.: US 11,662,992 B2
(45) Date of Patent: May 30, 2023

(54) ALGORITHM DOWNLOADING METHOD, DEVICE, AND RELATED PRODUCT

(71) Applicant: HUAWEI CLOUD COMPUTING TECHNOLOGIES CO., LTD., Gui'an New District (CN)

(72) Inventor: Pu Chen, Shenzhen (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 121 days.

(21) Appl. No.: 17/202,717

(22) Filed: Mar. 16, 2021

(65) Prior Publication Data
US 2021/0200531 A1    Jul. 1, 2021

Related U.S. Application Data

(63) Continuation of application No. PCT/CN2019/094217, filed on Jul. 1, 2019.

(30) Foreign Application Priority Data

Sep. 18, 2018    (CN) .......................... 201811089076.0

(51) Int. Cl.
*G06F 16/9538* (2019.01)
*G06F 8/36* (2018.01)
(Continued)

(52) U.S. Cl.
CPC .............. *G06F 8/65* (2013.01); *G06F 16/215* (2019.01); *G06F 16/245* (2019.01);
(Continued)

(58) Field of Classification Search
CPC ..... G06F 8/65; G06F 8/61; G06F 8/60; G06F 8/20; G06F 8/36; G06F 8/70; G06F 8/62;
(Continued)

(56) References Cited

U.S. PATENT DOCUMENTS 8,903,944 B2 * 12/2014 Broberg .................. H04L 67/10
709/248
2008/0021982 A1 * 1/2008 Hannuki ............... H04M 15/68
709/219
(Continued)

FOREIGN PATENT DOCUMENTS

| CN | 101158964 A | 4/2008 |
| CN | 101729509 A | 6/2010 |

(Continued)

OTHER PUBLICATIONS

Jens Krinke et al., Identifying Similar Code with Program Dependence Graphs, 2001 IEEE, [Retrieved on Dec. 28, 2022]. Retrieved from the internet: <URL: https://ieeexplore.ieee.org/stamp/stamp.jsp?tp=&arnumber=957835> 9 Pages (301-309) (Year: 2001).*

Primary Examiner — Anibal Rivera
(74) Attorney, Agent, or Firm — Maier & Maier, PLLC

(57) ABSTRACT

An algorithm download method, a device, and a related product. The method includes: obtaining an algorithm identifier of an algorithm and a capability description of a client; sending the algorithm identifier and the capability description to a cloud; and receiving a version code that is of the algorithm and that is returned by the cloud, where the version code is obtained by the cloud by searching based on the algorithm identifier and the capability description. According to the foregoing solution, an algorithm can be easily downloaded.

15 Claims, 5 Drawing Sheets

(51) Int. Cl.
*G06F 8/60* (2018.01)
*G06F 8/65* (2018.01)
*G06F 16/245* (2019.01)
*G06F 16/215* (2019.01)
*G06Q 20/14* (2012.01)
G06Q 10/10 (2023.01)
H04L 67/06 (2022.01)
H04L 67/1095 (2022.01)
G06F 8/61 (2018.01)
G06F 16/28 (2019.01)
G06F 16/33 (2019.01)
G06F 16/31 (2019.01)
G06Q 20/36 (2012.01)
G06F 16/903 (2019.01)

(52) U.S. Cl.
CPC ............ *G06Q 20/145* (2013.01); *G06F 8/60* (2013.01); *G06F 8/61* (2013.01); *G06F 8/62* (2013.01); *G06F 8/64* (2013.01); *G06F 16/285* (2019.01); *G06F 16/319* (2019.01); *G06F 16/334* (2019.01); *G06F 16/903* (2019.01); *G06Q 10/10* (2013.01); *G06Q 20/3672* (2013.01); *H04L 67/06* (2013.01); *H04L 67/1095* (2013.01)

(58) Field of Classification Search
CPC ........ G06F 8/64; G06F 16/245; G06F 16/215; G06F 16/9538; G06F 16/903; G06F 16/334; G06F 16/374; G06F 16/319; G06F 16/9536; G06F 16/2457; G06F 16/9535; G06F 16/288; G06F 16/285; G06Q 20/145; G06Q 20/3672; G06Q 10/10; G06Q 10/04; G06Q 10/1087; H04L 67/06; H04L 67/1095; H04L 67/02; H04L 67/2823

See application file for complete search history.

(56) References Cited

U.S. PATENT DOCUMENTS

| | | | |
|---|---|---|---|
| 2008/0091938 A1* | 4/2008 | Pedersen | G06F 21/602 713/153 |
| 2009/0210870 A1* | 8/2009 | Clark | G06F 9/445 709/202 |
| 2010/0250840 A1 | 9/2010 | Wong | |
| 2011/0282868 A1* | 11/2011 | Ishii | G06F 16/93 707/E17.014 |
| 2012/0331457 A1* | 12/2012 | Ryu | G06F 8/63 717/175 |
| 2013/0144994 A1 | 6/2013 | Li et al. | |
| 2016/0359931 A1* | 12/2016 | Goncharov | G06F 8/61 |
| 2017/0337355 A1* | 11/2017 | Biswas | G06F 21/62 |
| 2018/0270125 A1* | 9/2018 | Jain | H04L 67/1097 |
| 2019/0318271 A1* | 10/2019 | Miller | G06N 20/00 |

FOREIGN PATENT DOCUMENTS

| | | |
|---|---|---|
| CN | 104239111 A | 12/2014 |
| CN | 104410665 A | 3/2015 |
| CN | 106790278 A | 5/2017 |
| CN | 107147726 A | 9/2017 |
| CN | 107357612 A | 11/2017 |
| CN | 107608722 A | 1/2018 |
| CN | 108324801 A | 7/2018 |
| EP | 2224336 A1 | 9/2010 |
| GB | 2475787 A | 6/2011 |
| JP | 2013122768 A | 6/2013 |
| WO | 2018006884 A1 | 1/2018 |

* cited by examiner

ALGORITHM DOWNLOADING METHOD, DEVICE, AND RELATED PRODUCT

CROSS-REFERENCE TO RELATED APPLICATIONS

This application is a continuation of International Application No. PCT/CN2019/094217, filed on Jul. 1, 2019, which claims priority to Chinese Patent Application No. 201811089076.0, filed on Sep. 18, 2018, the disclosure of which is hereby incorporated by reference in its entirety.

TECHNICAL FIELD

The embodiments relate to the algorithm field, and in particular, to an algorithm download method, a device, and a related product.

BACKGROUND

With the rapid development of artificial intelligence technologies, a series of artificial intelligence algorithms have been developed. When an artificial intelligence algorithm is run on a client, the client can obtain a corresponding artificial intelligence capability. There is a one-to-one correspondence between an algorithm and an artificial intelligence capability. For example, if a client downloads a facial recognition algorithm, the client can obtain a corresponding facial recognition capability; if a client downloads a sleep quality detection algorithm, the client can obtain a corresponding sleep quality detection capability; and so on.

However, in a conventional technology, an artificial intelligence capability can be provided for a client only in a manner of a software development kit (SDK). In this manner, each time the client obtains an algorithm, a software development kit needs to be regenerated. Therefore, it is quite difficult for a client to obtain an algorithm.

SUMMARY

The embodiments provide an algorithm download method, a device, and a related product, to easily and conveniently downloaded an algorithm to a client.

According to a first aspect, an algorithm download method is provided, including the following steps:

obtaining an algorithm identifier of an algorithm and a capability description of a client;

sending the algorithm identifier and the capability description to a cloud; and receiving a version code that is of the algorithm and that is returned by the cloud, where the version code is obtained by the cloud by searching based on the algorithm identifier and the capability description.

With reference to the first aspect, in a first possible implementation of the first aspect, before the obtaining an algorithm identifier of an algorithm and a capability description of a client, the method further includes:

receiving the algorithm identifier and a version description that are input by a user;

querying, based on the algorithm identifier and the version description, whether the algorithm has been deployed on the client; and the obtaining an algorithm identifier of an algorithm and a capability description of a client includes:

when the algorithm is not deployed, obtaining the algorithm identifier of the algorithm and the capability description of the client.

With reference to any one of the foregoing implementations of the first aspect, in a second possible implementation of the first aspect, after the receiving a version that is of the algorithm and that is returned by the cloud, the method further includes:

receiving an invocation request, where the invocation request is used to request to invoke the version code;

sending a target token to the cloud, and receiving a verification result obtained by the cloud by verifying the target token; and when the verification result is that verification succeeds, allowing invocation of the version code.

With reference to any one of the foregoing implementations of the first aspect, in a third possible implementation of the first aspect, after the receiving the version code that is of the algorithm and that is returned by the cloud, the method further includes:

recording charging information of the version code, where the charging information includes one or more of a quantity of download times, a quantity of invocation times, and a quantity of forwarding times; and sending the charging information of the algorithm version to the cloud, so that the cloud calculates a usage fee of the version code based on the charging information.

With reference to any one of the foregoing implementations of the first aspect, in a fourth possible implementation of the first aspect, the capability description includes one or more of available storage space, available memory space, a floating-point operation capability, and a processor type.

According to a second aspect, an algorithm download method is provided, including:

receiving an algorithm identifier and a capability description that are sent by a client;

determining a version code of the algorithm based on the algorithm identifier, the capability description, and a target correspondence, where the target correspondence is a mapping relationship between the algorithm identifier, the capability description, and the version code; and returning the version code of the algorithm to the client.

With reference to the second aspect, in a first possible implementation of the second aspect, before the determining a version code of the algorithm based on the algorithm identifier, the capability description, and a target correspondence, the method further includes:

allocating the version code to a cloud node in a data amount balancing manner; or allocating the version code to a cloud node in an access traffic balancing manner.

With reference to any one of the foregoing implementations of the second aspect, in a second possible implementation of the second aspect, the method further includes:

determining, according to a deduplication algorithm, whether there is a duplicate version of the version code; and if there is a duplicate version, deleting the version code or the duplicate version.

With reference to any one of the foregoing implementations of the second aspect, in a third possible implementation of the second aspect, after the returning the version code of the algorithm to the client, the method further includes:

receiving charging information sent by the client, where the charging information includes one or more of a quantity of download times, a quantity of invocation times, and a quantity of forwarding times; and calculating a usage fee of the version code based on the charging information.

With reference to any one of the foregoing implementations of the second aspect, in a fourth possible implementation of the second aspect, the capability description includes one or more of available storage space, available memory space, a floating-point operation capability, and a processor type.

According to a third aspect, a client is provided, including an obtaining module, a sending module, and a receiving module.

The obtaining module is configured to obtain an algorithm identifier of an algorithm and a capability description of a client.

The sending module is configured to send the algorithm identifier and the capability description to a cloud.

The receiving module is configured to receive a version code that is of the algorithm and that is returned by the cloud. The version code is obtained by the cloud by searching based on the algorithm identifier and the capability description.

With reference to the third aspect, in a first possible implementation of the third aspect, the client further includes a query module.

The receiving module is configured to receive the algorithm identifier and a version description that are input by a user.

The query module is configured to query, based on the algorithm identifier and the version description, whether the algorithm has been deployed on the client.

The obtaining module is configured to: when the algorithm is not deployed, obtain the algorithm identifier of the algorithm and the capability description of the client.

With reference to any one of the foregoing implementations of the third aspect, in a second possible implementation of the third aspect, the client further includes a verification module.

The receiving module is configured to receive an invocation request, where the invocation request is used to request to invoke the version code.

The sending module is configured to: send a target token to the cloud and receive a verification result obtained by the cloud by verifying the target token.

The verification module is configured to: when the verification result is that verification succeeds, allow invocation of the version code.

With reference to any one of the foregoing implementations of the third aspect, in a third possible implementation of the third aspect, the client further includes a charging module.

The charging module is configured to record charging information of the version code. The charging information includes one or more of a quantity of download times, a quantity of invocation times, and a quantity of forwarding times.

The sending module is configured to send the charging information of the algorithm version to the cloud, so that the cloud calculates a usage fee of the version code based on the charging information.

With reference to any one of the foregoing implementations of the third aspect, in a fourth possible implementation of the third aspect, the capability description includes one or more of available storage space, available memory space, a floating-point operation capability, and a processor type.

According to a fourth aspect, a cloud service cluster is provided, including a receiving module, a determining module, and a sending module.

The receiving module is configured to receive an algorithm identifier and a capability description that are sent by a client.

The determining module is configured to determine a version code of the algorithm based on the algorithm identifier, the capability description, and a target correspondence. The target correspondence is a mapping relationship between the algorithm identifier, the capability description, and the version code.

The sending module is configured to return the version code of the algorithm to the client.

With reference to the fourth aspect, in a first possible implementation of the fourth aspect, the cluster further includes a balancing module. The balancing module is configured to:

allocate the version code to a cloud node in a data amount balancing manner; or allocate the version code to a cloud node in an access traffic balancing manner.

With reference to any one of the foregoing implementations of the fourth aspect, in a second possible implementation of the fourth aspect, the cluster further includes a deletion module. The deletion module is configured to:

determine, according to a deduplication algorithm, whether there is a duplicate version of the version code; and if there is a duplicate version, delete the version code or the duplicate version.

With reference to any one of the foregoing implementations of the fourth aspect, in a third possible implementation of the fourth aspect, the cluster further includes a charging module.

The receiving module is configured to receive charging information sent by the client. The charging information includes one or more of a quantity of download times, a quantity of invocation times, and a quantity of forwarding times.

The charging module is configured to calculate a usage fee of the version code based on the charging information.

With reference to any one of the foregoing implementations of the fourth aspect, in a fourth possible implementation of the fourth aspect, the capability description includes one or more of available storage space, available memory space, a floating-point operation capability, and a processor type.

According to a fifth aspect, a client is provided, including: a memory, and a processor and a communications module that are coupled to the memory. The communications module is configured to send data or receive data sent from the outside. The memory is configured to store program code. The processor is configured to invoke the program code stored in the memory, to perform the method according to any one of the implementations of the first aspect.

According to a sixth aspect, a cloud service cluster is provided, including at least one computing node and at least one storage node. The at least one computing node communicates with the at least one storage node through a communications network. The at least one computing node is configured to perform the method according to any one of the implementations of the second aspect.

According to a seventh aspect, a computer non-transitory storage medium is provided, including an instruction. When the instruction is run on a client, the client is enabled to perform the method according to any one of the implementations of the first aspect.

According to an eighth aspect, a computer non-transitory storage medium is provided, including an instruction. When the instruction is run on a server or a cloud service cluster, the server or the cloud service cluster is enabled to perform the method according to any one of the implementations of the second aspect.

According to a ninth aspect, a computer program product is provided. The computer program product includes a program instruction. When the computer program product is executed by a computer, the computer performs the method according to any one of the implementations of the first aspect.

According to a tenth aspect, a computer program product is provided. The computer program product includes a program instruction. When the computer program product is executed by a computer, the computer performs the method according to any one of the implementations of the second aspect.

In the foregoing solution, the client may download a corresponding version code from the cloud based on the algorithm identifier of the algorithm and the capability description of the client, to obtain a corresponding intelligent capability. In this case, a software development kit does not need to be generated. During downloading, the client only needs to obtain a corresponding version code based on the algorithm identifier and the capability description, to obtain a corresponding intelligent capability. This greatly simplifies algorithm downloading. Therefore, an algorithm can be easily downloaded.

DETAILED DESCRIPTION OF EMBODIMENTS

Figure 1:
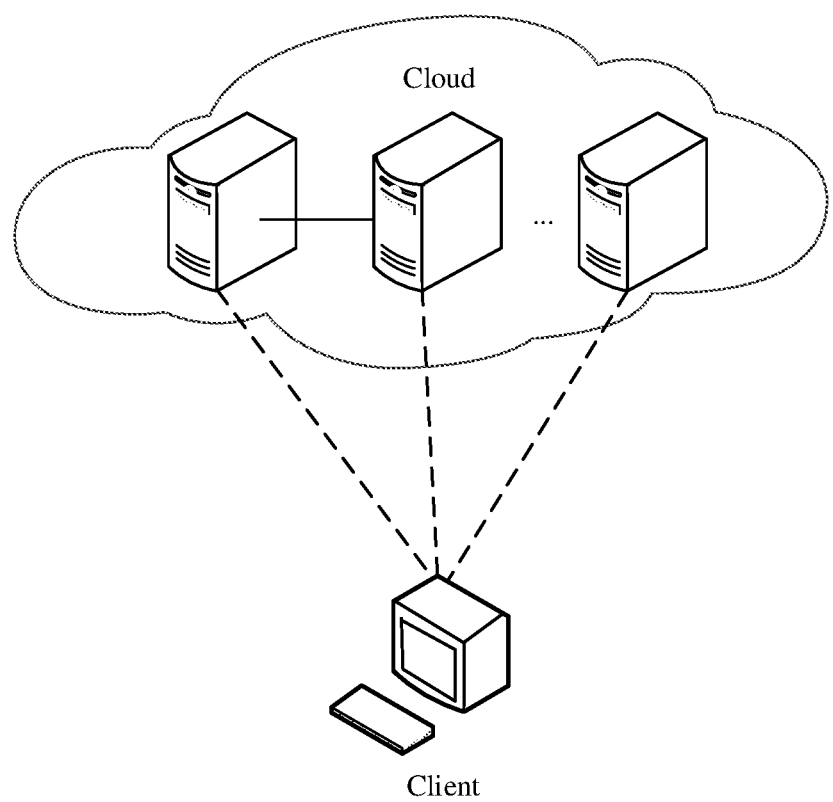
FIG. 1 is a schematic diagram of an application scenario according to an embodiment.

FIG. 1 is a schematic diagram of an application scenario according to an embodiment. As shown in FIG. 1, a client is connected to a cloud through a wired or wireless network. The cloud refers to a resource cluster that can be shared by a plurality of clients. The resource cluster can provide a plurality of algorithms for use of the clients. The resource cluster may belong to a public cloud or a private cloud. If the resource cluster belongs to a public cloud, the resource cluster may be used by different company users and individual users. If the resource cluster belongs to a private cloud, the resource cluster generally serves only a company user to which the private cloud belongs. The client may be any one or more of a mobile terminal, a tablet computer, a notebook computer, a desktop computer, a wearable device, a smart household appliance, a smart robot, a virtual reality head mounted display, or the like. This is not limited herein.

Figure 2:
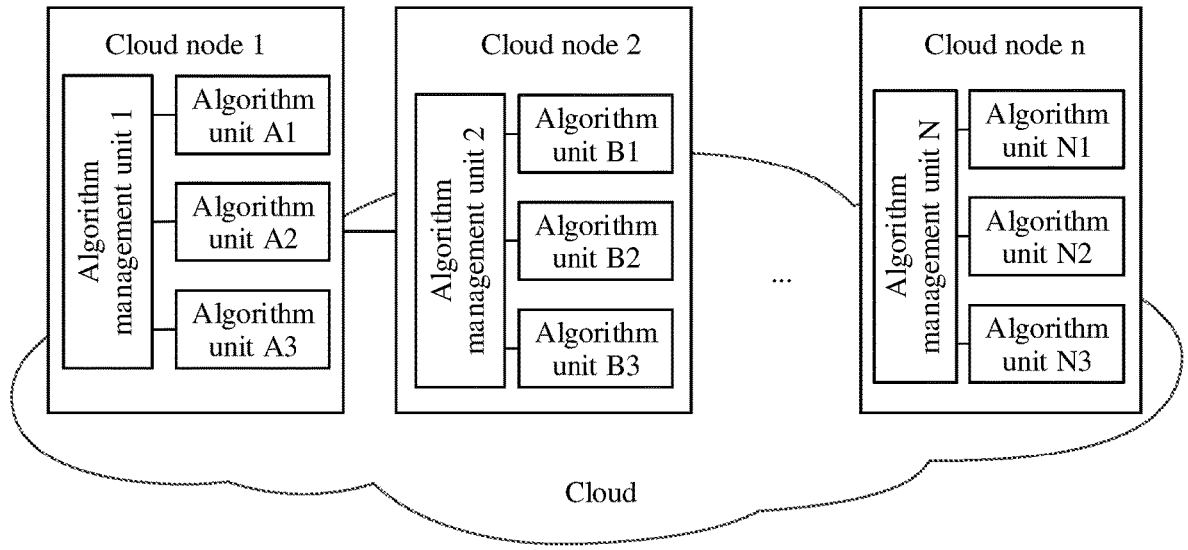
FIG. 2 is a schematic structural diagram of a cloud according to the embodiments.

As shown in FIG. 2, a cloud includes a plurality of cloud nodes, and an algorithm management unit and a plurality of algorithm units are deployed on each cloud node. A cloud node may be a virtual machine or a physical computing node. For ease of description, an example in which each cloud node has one algorithm management unit is used herein for description. However, during actual application, a plurality of cloud nodes may share one algorithm management unit. This is not limited herein. The algorithm management unit is configured to manage the algorithm unit, and the algorithm unit includes at least an algorithm identifier and an algorithm. The algorithm identifier is a unique identifier of the algorithm. The algorithm identifier may have an index function or not. The algorithm is a set of instructions for solving specific problems, for example, a facial recognition algorithm, an encryption algorithm, a sorting algorithm, a retrieval algorithm, a randomized algorithm, and a parallel algorithm. The algorithm includes a plurality of algorithm versions, a plurality of version descriptions, and a plurality of version codes. There is a one-to-one correspondence between the algorithm version, the version description, and the version code. The algorithm version depends on an interface version and a configuration version. The interface version may be an API (Application Programming Interface) 2.0 version, an API 3.0 version, or the like. The configuration version may be a graphics processing unit (GPU) version, a central processing unit (CPU) version, an ARM (Advanced RISC Machine) version, or the like. The version description is used to describe basic information of the algorithm version, for example, a storage space size required by the algorithm version, a storage memory size required by the algorithm version, a floating-point operation capability required by the algorithm version, and an instruction set supported by the algorithm version. In an embodiment, algorithm units of a client may be shown in Table 1.

TABLE 1

| Algorithm units on the cloud node | | | | |
|---|---|---|---|---|
| | | Algorithm | | |
| | | Algorithm version | | |
| Algorithm identifier | Version code | Interface version | Configuration version | Version description |
| ID0001 | Version algorithm code 1 | API 3.0 | GPU version | Storage space: 5 G; a memory: 2 G; a floating-point computing capability: 1 billion operations per second; and a processor type: a GPU |
| | Version algorithm code 2 | API 2.0 | CPU version | Storage space: 3 G; a memory: 1 G; a floating-point computing capability: 500 million operations per second; and a processor type: a CPU |

TABLE 1-continued

Algorithm units on the cloud node

| | | Algorithm | | |
|---|---|---|---|---|
| | | Algorithm version | | |
| Algorithm identifier | Version code | Interface version | Configuration version | Version description |
| ID0002 | Version algorithm code 1 | API 2.0 | ARM version | Storage space: 1 G; a memory: 0.5 G; a floating-point computing capability: 100 million operations per second; and a processor type: an ARM |
| | Version algorithm code 2 | API 3.0 | CPU version | Storage space: 2 G; a memory: 1 G; a floating-point computing capability: 300 million operations per second; and a processor type: a CPU |
| | Version algorithm code 3 | API 3.0 | GPU version | Storage space: 3 G; a memory: 2 G; a floating-point computing capability: 500 million operations per second; and a processor type: a GPU |
| ... | ... | ... | ... | ... |

It should be understood that the foregoing example is described by using an example in which algorithm units are distributed on a plurality of cloud nodes. In another embodiment, a plurality of algorithm units may alternatively be distributed on a same cloud node. This is not limited herein.

In this embodiment, the algorithm units may be evenly allocated to the cloud nodes on the cloud in the following manners.

In a first manner, the algorithm units may be allocated to the cloud nodes on the cloud in a data amount balancing manner. It should be understood that a length of a to-be-uploaded algorithm unit may be learned and used storage space of each cloud node may also be learned. Therefore, a cloud node to which the to-be-uploaded algorithm unit is allocated may be determined based on the length of the to-be-uploaded algorithm unit and the used storage space of each cloud node on the cloud. Because a data amount of the algorithm unit is usually unchanged, balancing may be performed in a static balancing manner, or balancing may be performed in a dynamic balancing manner. This is not limited herein. In the static balancing manner, when an algorithm unit is stored, a regulation and control policy is used for preventing a possible load imbalance. Static balancing algorithms mainly include a node spatial partitioning method, a multi-hash method, and the like. In the dynamic balancing manner, load information of the node is collected in real time during system running, to dynamically adjust a load imbalance.

In a second manner, the algorithm units may be allocated to the cloud nodes on the cloud in an access traffic balancing manner. It should be understood that access traffic of the algorithm unit is unpredictable, and the access traffic of the algorithm unit varies at any time. For example, when an algorithm unit A is initially released, the algorithm unit A is not popular, and access traffic of the algorithm unit A is not high. Subsequently, the algorithm unit A gradually wins recognition of a large quantity of users and thrives with soaring access traffic. Later, the algorithm unit A is no longer popular, and the access traffic gradually decreases. Therefore, an algorithm unit may be first randomly allocated to any cloud node. Then, access traffic information of the algorithm unit is collected in real time, and dynamic adjustment is performed based on the access traffic information of the algorithm unit.

It should be understood that the foregoing balancing manners are all used as examples. During actual application, another balancing manner, for example, a node balancing manner, may be alternatively used. This is not limited herein.

To prevent the cloud repeatedly storing a same algorithm unit a plurality of times, the same algorithm unit may be further deleted by using a deduplication algorithm described in the following.

In a first manner, the deduplication algorithm may be a hash algorithm. A mathematical expression of the hash algorithm is as follows: CA=Hc(content), where content represents a character string of any length, CA represents a hash value obtained after a hash change, and Hc( ) represents the hash algorithm. The hash algorithm may be an MD5 algorithm, an SHA-1 algorithm, or the like. During application, the cloud may use content of a first algorithm unit as input of the hash algorithm, to calculate a first hash value, and use content of a second algorithm unit as input of the hash algorithm, to calculate a second hash value. Then, the cloud compares the first hash value with the second hash value. When the first hash value is the same as the second hash value, the cloud determines that the content of the first algorithm unit is the same as the content of the second algorithm unit, and deletes the first algorithm unit or the second algorithm unit.

In a second manner, the deduplication algorithm may be a content-based recognition algorithm. Herein, a first algorithm unit stores first metadata, and a second algorithm unit stores second metadata. The first metadata is descriptive information of the first algorithm unit, and the second metadata is descriptive information of the second algorithm unit. During application, the cloud extracts the first metadata from the first algorithm unit and extracts the second metadata from the second algorithm unit. Then, the cloud compares the first metadata with the second metadata. When the first metadata is the same as the second metadata, the cloud determines that content of the first algorithm unit is the same as content of the second algorithm unit and deletes the first algorithm unit or the second algorithm unit.

It should be understood that the foregoing deduplication algorithm is merely used as an example. During actual application, another algorithm may be used. This is not limited herein.

Figure 3:
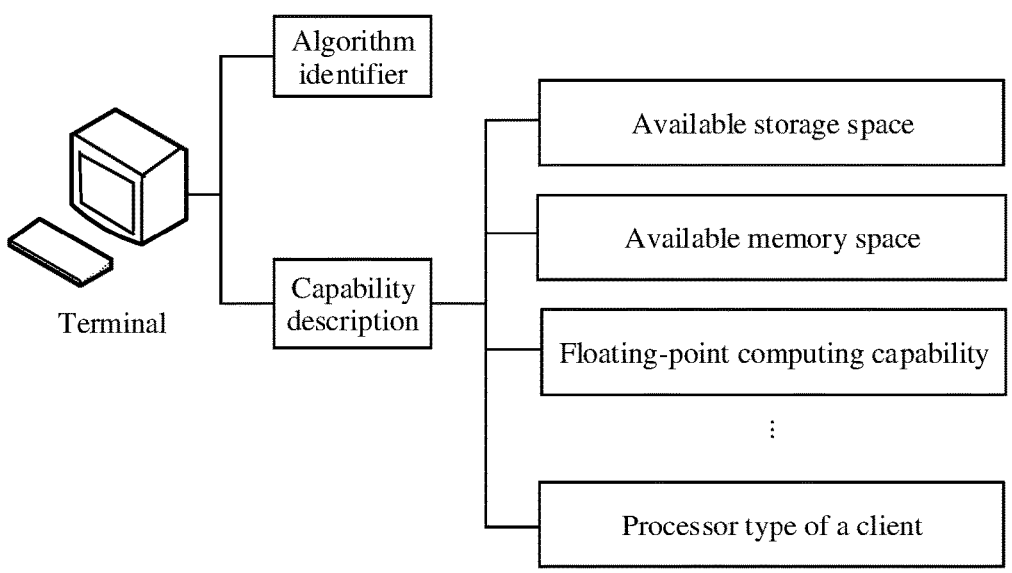
FIG. 3 is a schematic diagram of obtaining an algorithm identifier and a capability description by a client according to the embodiments.

As shown in FIG. 3, a client may obtain an algorithm identifier of an algorithm that is expected to be downloaded and a capability description of the client. The capability description is used to describe a capability of the client, for example, available storage space, available memory space, a floating-point operation capability, and a processor type. In a specific embodiment, the capability description of the client may be shown in Table 2.

TABLE 2

Capability description of the client

| Item | Description |
| --- | --- |
| Available storage space | 5 G |
| Available memory space | 1 G |
| Floating-point computing capability | 1 billion operations per second |
| Processor type | GPU |
| . . . | . . . |

It should be understood that the foregoing capability description of the client is merely an example. In another embodiment, there may be more or fewer items in the capability description of the client. This is not limited herein.

The algorithm identifier may be entered by a user to the client. For example, an algorithm identifier and an algorithm introduction of each algorithm unit on the cloud may be published on a website A. The user determines, by reading the algorithm introduction recorded on the website A, a desired algorithm unit, and inputs an algorithm identifier of the algorithm unit into the client.

The capability description may be obtained by the client through detection. For example, the client may obtain, by detecting a hardware resource, content corresponding to various items of the client. For the available storage space, a storage device of the client keeps collecting statistics on used storage space and the available storage space in real time. Therefore, the client may directly query the storage device to obtain the available storage space. For the available memory space, the memory of the client collects statistics on used storage space and the available storage space in real time. Therefore, the client may directly query the memory to obtain the available memory space. For the floating-point computing capability, the client may run a program to test the floating-point computing capability of the client. For the processor type, a processor of the client stores a descriptive text of the processor type, and the client may directly query the processor to obtain the processor type. A manner of obtaining the available storage space, the available memory space, the floating-point operation capability, and the processor type is merely an example, and should not constitute a limitation.

Figure 4:
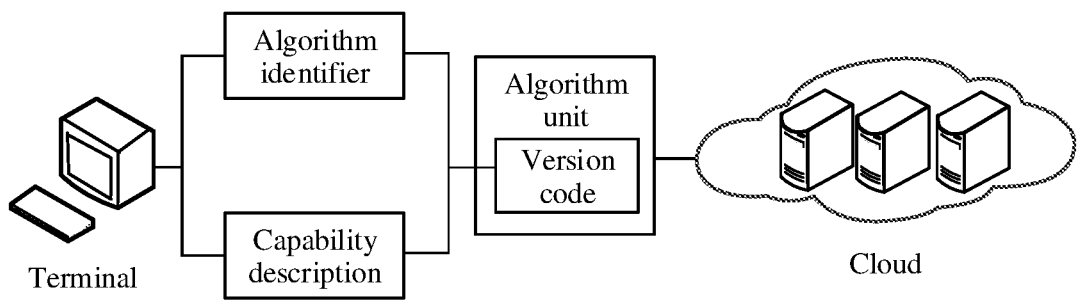
FIG. 4 is a schematic diagram of downloading a version code from a cloud by a client according to the embodiments.

As shown in FIG. 4, a cloud may find, based on an algorithm identifier, a capability description, and a target correspondence, a version code of an algorithm that needs to be downloaded. The target correspondence is a mapping relationship between the algorithm identifier, the capability description, and the version code. In a specific embodiment, the target correspondence may be shown in Table 3.

TABLE 3

| | | Target correspondence | | | |
| --- | --- | --- | --- | --- | --- |
| | | Algorithm version | | | |
| Algorithm identifier | Capability description | Interface version | Configuration version | Version description | Version code |
| ID0001 | Available storage space: 7 G; available memory space: 3 G; a floating-point computing capability: 1.2 billion; and a processor type: a GPU | API 3.0 | GPU version | Storage space: 5 G; a memory: 2 G; a floating-point computing capability: 1 billion operations per second; and a processor type: a GPU | Version algorithm code 1 |
| | Available storage space: 4 G; available memory space: 1.5 G; a floating-point computing capability: 600 million; and a processor type: a CPU | API 2.0 | CPU version | Storage space: 3 G; a memory: 1 G; a floating-point computing capability: 500 million operations per second; and a processor type: a CPU | Version algorithm code 2 |
| ID0002 | Available storage space: 2 G; available memory space: 0.6 G; a floating-point computing capability: 200 million; and a | API 2.0 | ARM version | Storage space: 1 G; a memory: 0.5 G; a floating-point computing capability: 100 million | Version algorithm code 1 |

TABLE 3-continued

Target correspondence

| Algorithm identifier | Capability description | Algorithm version | | | |
|---|---|---|---|---|---|
| | | Interface version | Configuration version | Version description | Version code |
| | processor type: an ARM | | | operations per second; and a processor type: an ARM | |
| | Available storage space: 3 G; available memory space: 2 G; a floating-point computing capability: 500 million; and a processor type: a CPU | API 3.0 | CPU version | Storage space: 2 G; a memory: 1 G; a floating-point computing capability: 300 million operations per second; and a processor type: a CPU | Version algorithm code 2 |
| | Available storage space: 4 G; available memory space: 3 G; and a floating-point computing capability: 500 million; and a processor type: a GPU | API 3.0 | GPU version | Storage space: 3 G; a memory: 2 G; and a floating-point computing capability: 500 million operations per second; and a processor type: a GPU | Version algorithm code 3 |
| . . . | . . . | . . . | . . . | . . . | |

It should be understood that the foregoing target correspondence is merely an example. In another implementation, the target correspondence may alternatively be in another form. This is not limited herein.

To resolve a problem, in a conventional technology, that it is relatively difficult to download an algorithm, the embodiments provide an algorithm download method to easily download a code version and obtain an intelligent capability corresponding to the algorithm.

Figure 5:
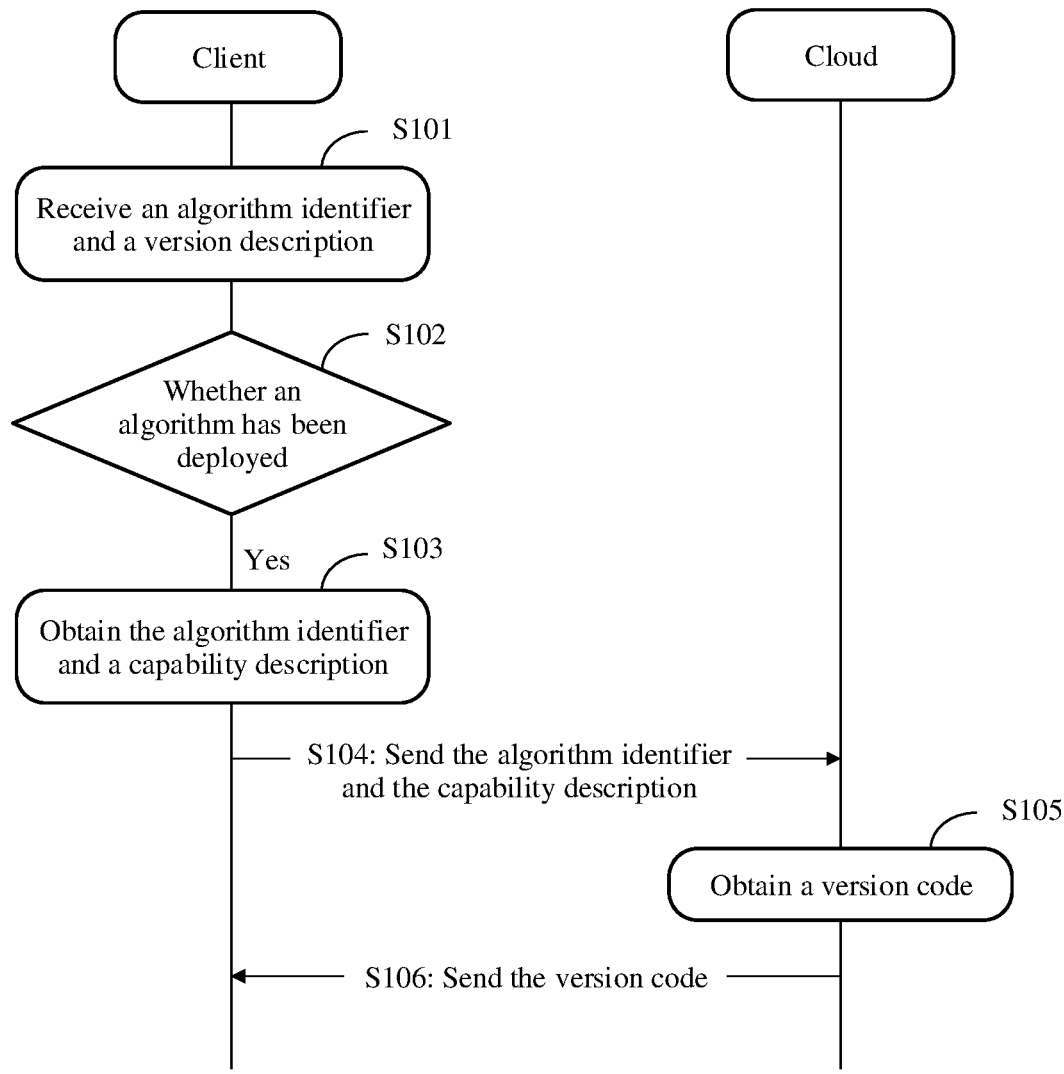
FIG. 5 is an interaction flowchart of an algorithm download method according to the embodiments.

FIG. 5 is an interaction flowchart of an algorithm download method according to the embodiments. As shown in FIG. 5, the algorithm download method in this embodiment includes the following steps.

S101: A client receives an algorithm identifier of an algorithm and a version description of the algorithm that are input by a user.

In this embodiment, the client may be provided with a user interface, and the user may enter an algorithm name and version information in the user interface. The client may receive the algorithm identifier and the version information that are input on the user interface. Further, the client may alternatively receive the algorithm identifier and the version description that are input in a manner such as voice input. This is not limited herein. In addition, the version description may include more algorithm-related information, for example, a release time of the algorithm.

S102: The client queries, based on the algorithm identifier and the version description, whether the algorithm has been deployed on the client.

In this embodiment, the client queries, based on the algorithm identifier and the version description, whether a version code has been deployed on the client. If the version code has been deployed on the client, the client may terminate a procedure. Alternatively, the client may query a cloud for an updated version, and if there is an updated version, download the updated version. If the version code is not deployed on the client, the following procedures S103 to S106 are performed.

S103: When the algorithm is not deployed, the client obtains the algorithm identifier of the algorithm and a capability description of the client.

In this embodiment, the client may obtain the algorithm identifier of the algorithm and the capability description of the client. For details, refer to FIG. 3 and related content. Details are not described herein again.

S104: The client sends the algorithm identifier and the capability description to the cloud. Correspondingly, the cloud receives the algorithm identifier and the capability description that are sent by the client.

In this embodiment, the client may first send the algorithm identifier to the cloud, and then sends the capability description to the cloud. Alternatively, the client may simultaneously send both the algorithm identifier and the capability description to the cloud. This is not limited herein.

S105: The cloud determines the version code of the algorithm based on the algorithm identifier, the capability description, and a target correspondence. The target correspondence is a mapping relationship between the algorithm identifier, the capability description, and the algorithm version.

In this embodiment, the cloud pre-stores the target correspondence between the algorithm identifier, the capability description, and the version code. For details, refer to Table 3 and related content. Details are not described herein again.

S106: The cloud returns the version code of the algorithm to the client. Correspondingly, the client receives the version code that is of the algorithm and that is returned by the cloud.

It should be understood that the foregoing step S101 to step S103 are optional steps. During actual application, the client may not query whether the algorithm has been deployed, but directly download, based on the algorithm identifier of the algorithm and the capability description of the client, the version code that needs to be downloaded. This is not limited herein.

After the version code is downloaded to the client, if the client needs to invoke the version code, an identity of the client needs to be verified. The version code can be invoked only after verification performed on the client succeeds. The identity of the client may be verified in at least the following two manners:

In a first manner, the identity is verified by using a key (AccessKey/SecretKey) mechanism. Before verification, the client registers a user name and password with the cloud through the user interface, and the cloud stores the user name and password on the cloud. During verification, the client sends an invocation request to the cloud. The invocation request includes the user name and password. The cloud performs verification on the target token and obtains a verification result. The cloud sends the verification result to the client. Correspondingly, the client receives the verification result sent by the cloud. When the verification result is that the verification succeeds, the client is allowed to invoke the version code.

In a second manner, the identity is verified by using a token mechanism. Before verification, the client enters a user name and password in the user interface to request to log in to the cloud. Then, the client sends a login request to the cloud, where the login request includes the user name and password. Correspondingly, the cloud receives the login request from the client. After receiving the login request, the client verifies whether the user name and password are correct. If the user name and password are correct, the cloud generates a target token and sends the target token to the client. After receiving the target token, the client stores the target token on the client. During verification, the client sends an invocation request to the cloud. The invocation request includes the target token and is used to request to invoke the version code. Correspondingly, the cloud receives the invocation request sent by the client. The cloud performs verification on the target token and obtains a verification result. The cloud sends the verification result to the client. Correspondingly, the client receives the verification result sent by the cloud. When the verification result is that the verification succeeds, the client is allowed to invoke the version code. To improve verification reliability, the target token may be set to be invalid when a validity period expires. For example, the validity period may be 5 minutes, 10 minutes, or the like. After the target token is invalid, a new target token may be generated for verification.

It should be understood that the foregoing verification process requires participation of both the client and the cloud. However, during actual application, the foregoing verification process may alternatively be performed only on the client. This is not limited herein.

When the user invokes the algorithm version, the client needs to record charging information of the version code, to charge based on the charging information of the version code. The charging information includes one or more of a quantity of download times, a quantity of invoking times, a quantity of forwarding times, or a quantity of use times. Generally, a larger quantity of times the version code is downloaded indicates a larger fee that the client needs to pay. A larger quantity of times the version code is invoked indicates a larger fee that the client needs to pay. A larger quantity of times the version code is forwarded indicates a larger fee that the client needs to pay. A larger quantity of times the version code is used indicates a larger fee that the client needs to pay. Further, during actual application, charging may be performed with some preferential policies. For example, if the version code is used for five times, one time for using the version code is presented. The client sends the charging information of the version code to the cloud, so that the cloud calculates a usage fee of the version code based on the charging information.

The embodiments provide an algorithm download system. The algorithm download system includes a client and a cloud. The cloud stores and maintains a plurality of algorithms. The client may selectively download one or more algorithms from the cloud to obtain corresponding intelligent capabilities.

Figure 6:
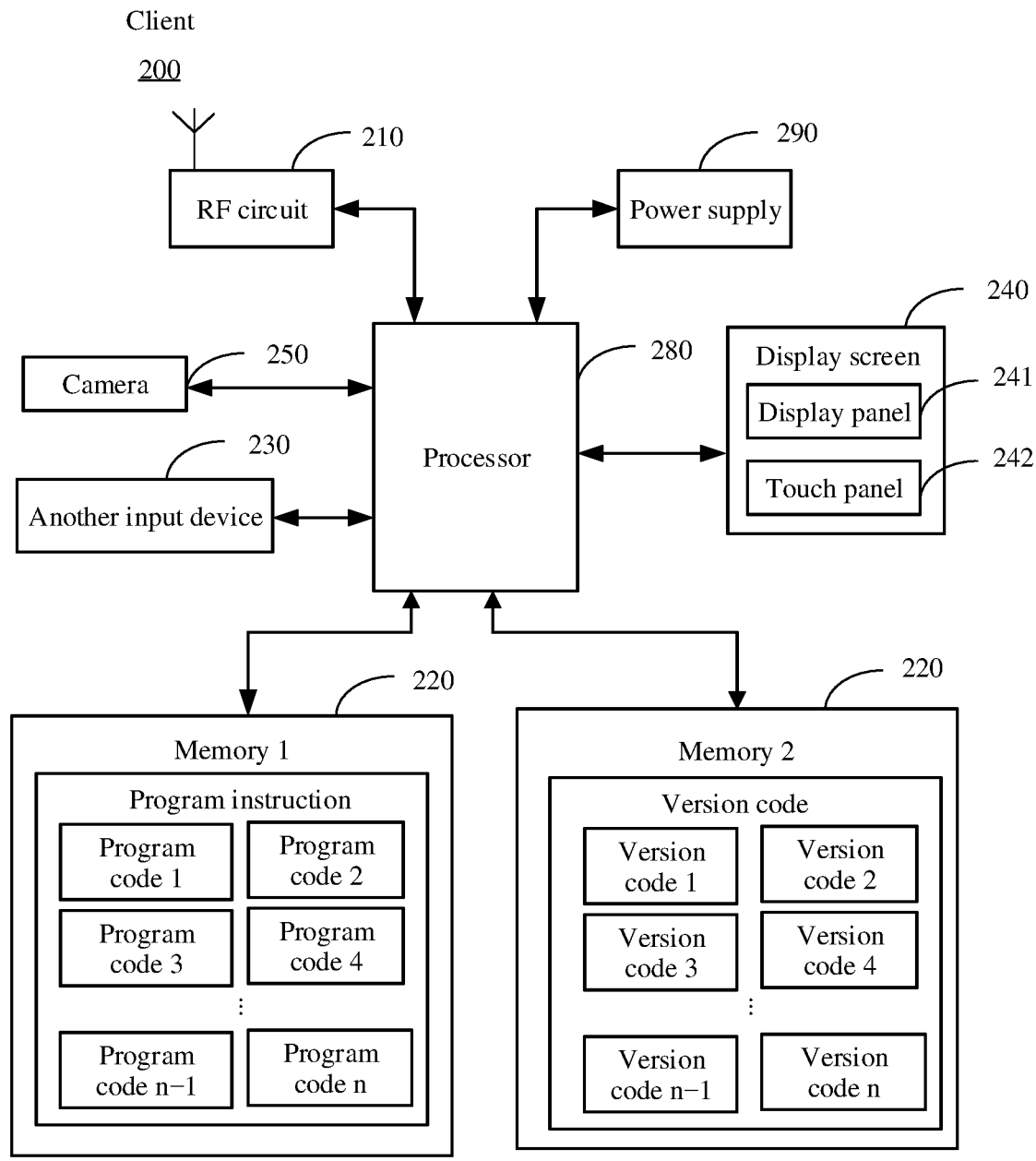
FIG. 6 is a schematic structural diagram of a client according to the embodiments.

FIG. 6 is a schematic structural diagram of a client according to the embodiments. As shown in FIG. 6, the client in this embodiment includes components such as an RF (radio frequency) circuit 210, a memory 220, another input device 230, a display screen 240, an I/O subsystem 270, a processor 280, and a power supply 290. A person of ordinary skill in the art may understand that a structure of the client shown in FIG. 6 is not a limitation on the client. The client may include more or fewer components than those shown in the figure. Some components may be combined, or some components may be split, or there may be a different component arrangement. A person of ordinary skill in the art may understand that the display screen 240 may be configured to display a user interface (UI).

The following describes the components of the client 200 in detail with reference to FIG. 6.

The RF circuit 210 may be configured to send or receive data. The RF circuit usually includes but is not limited to an antenna, at least one amplifier, a transceiver, a coupler, an LNA (low noise amplifier), a duplexer, and the like. In addition, the RF circuit 210 may further communicate with a network and another device through wireless communication. The memory 220 may include a high-speed random access memory or may include a nonvolatile memory such as at least one magnetic disk storage device, a flash memory device, or another volatile solid-state storage device. The memory 220 may include one or more program instructions that can be run by the processor 280 and may further store one or more version codes. For example, if the client stores a version code of a facial recognition algorithm, the client has a facial recognition capability; and if the client stores a sleep quality detection algorithm, the client has a sleep quality detection capability. It may be understood that, for ease of representation, an example in which the program instruction is stored in a memory 1 and the version code is stored in a memory 2 is used for description in FIG. 6. However, during actual application, there may be only one memory, and both the program instruction and the version code are stored in the memory.

The another input device 230 may be configured to receive input numeral or character information and generate a key signal input related to user setting and function control. For example, the another input device 230 may include, but is not limited to: one or more of a physical keyboard, a function key (such as a volume control key or an on/off key), a trackball, a mouse, a joystick, an optical mouse (the optical mouse is a touch-sensitive surface that does not display visual output, or an extension of a touch-sensitive surface formed by a touchscreen), and the like. The another input device 230 is connected to another input device controller 271 of the I/O subsystem 270 and exchanges a signal with the processor 280 under control of the another input device controller 271.

The display screen 240 may include a display panel 241 and/or a touch panel 242.

A camera 250 may be any camera (for example, a static camera or a video camera) configured to obtain an image.

The processor 280 is a control center of the client 200 and connects all parts of the entire client 200 by using various interfaces and lines. The processor 280 performs various functions of the client 200 and processes data by running or executing a software program and/or a module that are/is stored in the memory 220 and invoking data stored in the memory 220, to perform overall monitoring on the client 200. Optionally, the processor 280 may include one or more processing units. Further, in an embodiment, the processor 280 may integrate modem processors, where the modem processors mainly process wireless communication. It may be understood that the modem processor may alternatively not be integrated into the processor 280.

The client 200 in the embodiments may be configured to perform the steps performed by the client in the method procedure shown in FIG. 5. For brevity, details are not described herein again. For details, refer to FIG. 5 and the related descriptions.

Figure 7:
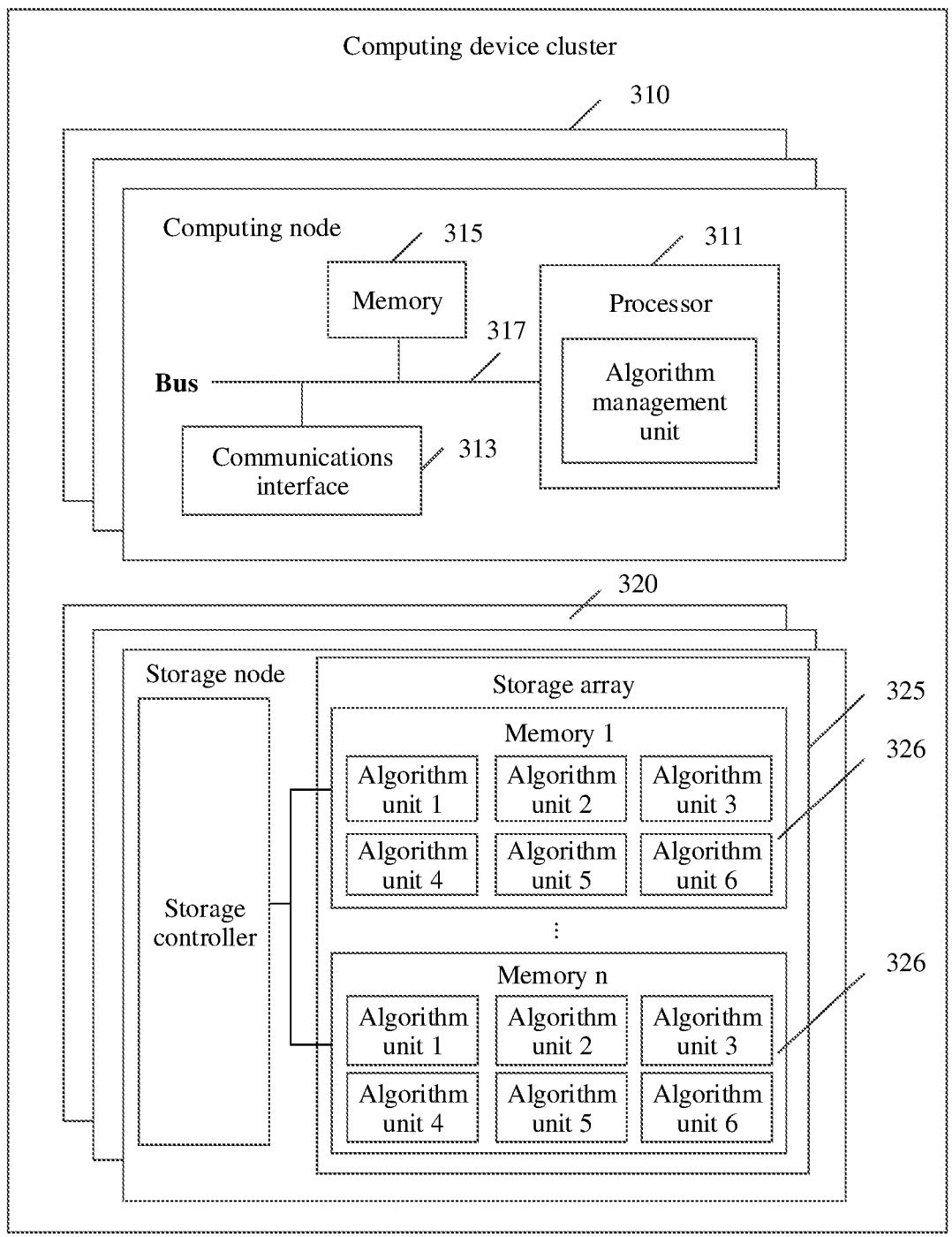
FIG. 7 is a schematic structural diagram of a cloud computing cluster according to the embodiments.

FIG. 7 is a schematic structural diagram of an implementation according to the embodiments. A system includes a computing node cluster. The computing node cluster includes at least one computing node 310 and at least one storage node 320. The computing node cluster may be deployed in a cloud data center.

The computing node 310 includes one or more processors 311, a communications interface 313, and a memory 315. The processor 311, the communications interface 313, and the memory 315 may be connected through a bus 317.

The processor 311 includes one or more general purpose processors. The general purpose processor may be any type of device that can process an electronic instruction, and includes a central processing unit (CPU), a microprocessor, a microcontroller, a main processor, a controller, an ASIC (application-specific integrated circuit), or the like. The processor 311 may be a dedicated processor only for the computing node 310 or may be shared with another computing node 310. The processor 311 executes various types of digital storage instructions such as software or firmware instructions stored in the memory 315, so that the computing node 310 can provide a wide variety of services. For example, the processor 311 can execute a program or process data, to execute at least a part of the method discussed in the embodiments. The processor 311 may run an algorithm management unit.

The communications interface 313 may be a wired interface (for example, an Ethernet interface) or a wireless interface (for example, a cellular network interface or a wireless local area network interface) and is configured to communicate with another computing device or another user. The memory 315 may include a volatile memory, for example, a random access memory (RAM). The memory 315 may further include a non-volatile memory, for example, a read-only memory (ROM), a flash memory, a hard disk drive (HDD), or a solid-state drive (SSD). Alternatively, the memory may include a combination of the foregoing types of memories.

The storage node 320 includes one or more storage controllers 321 and a storage array 325. The storage controller 321 and the storage array 325 may be connected through a bus 326.

The storage controller 321 includes one or more general purpose processors. The general purpose processor may be any type of device that can process an electronic instruction. The general purpose processor includes a CPU, a microprocessor, a microcontroller, a main processor, a controller, an ASIC, or the like. The storage controller 321 may be a dedicated processor only for the storage node 320 or may be shared with the computing node 310 or another storage node 320. It may be understood that, in this embodiment, each storage node includes one storage controller. In another embodiment, a plurality of storage nodes may share one storage controller. This is not limited herein.

The storage array 325 may include a plurality of memories. The memory may be a non-volatile memory, for example, a ROM, a flash memory, an HDD, or an SSD. The memory may alternatively include a combination of the foregoing types of memories. For example, the storage array may include a plurality of HDDs or a plurality of SDDs, or the storage array may include an HDD and an SDD. With the assistance of the storage controller 321, the plurality of memories are combined in different manners to form a memory group, to provide better storage performance than a single memory and provide a data backup technology. Optionally, the memory array 325 may include one or more data centers. The plurality of data centers may be disposed at a same location or may be disposed at different locations. This is not limited herein.

The computing node is configured to perform the steps performed by a cloud in the method procedure shown in FIG. 5. For brevity, details are not described herein again. For details, refer to FIG. 5 and the related descriptions.

In the foregoing solution, a client may download a corresponding version code from the cloud based on an algorithm identifier of an algorithm and a capability description of the client, to obtain a corresponding intelligent capability. During downloading, the client only needs to obtain a corresponding version code based on the algorithm identifier and the capability description, to obtain a corresponding intelligent capability. This greatly simplifies algorithm downloading. Therefore, an algorithm can be easily downloaded.

In the several embodiments provided, it should be understood that the disclosed system, client, and method may be implemented in another manner. For example, the described apparatus embodiments are merely examples. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on an actual requirement to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware or may be implemented in a form of a software functional unit.

When the integrated unit is implemented in a form of a software functional unit and sold or used as an independent product, the integrated unit may be stored in a computer-readable storage medium. Based on such an understanding, the solutions of the embodiments essentially, or the part contributing to a conventional technology, or all or some of the solutions may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes any medium that can store program code, for example, a USB flash drive, a removable hard disk, a read-only memory (ROM), a random access memory (RAM), a magnetic disk, or an optical disc.

The foregoing descriptions are merely embodiments, but are not intended as limiting. Any modification or replacement readily figured out by a person of ordinary skill in the art within the shall fall within the scope of the embodiments.

What is claimed is:

1. A method comprising:
   obtaining an algorithm identifier of an algorithm and a capability description of a client;
   sending the algorithm identifier and the capability description to a cloud; and
   receiving a version code that is of the algorithm and that is returned by the cloud, wherein the version code is obtained by the cloud by searching based on the algorithm identifier and the capability description, wherein the capability description comprises one or more of a floating-point operation capability and a processor type.

2. The method according to claim 1, wherein before the obtaining of the algorithm identifier of the algorithm and the capability description of the client, the method further comprises:
   receiving the algorithm identifier of the algorithm and a version description of the algorithm that are input by a user;
   querying, based on the algorithm identifier and the version description, whether the algorithm has been deployed on the client, and the obtaining of the algorithm identifier of the algorithm and the capability description of the client further comprises:
   when the algorithm is not deployed, obtaining the algorithm identifier of the algorithm and the capability description of the client.

3. The method according to claim 1, wherein after the receiving of the version code that is of the algorithm and that is returned by the cloud, the method further comprises:
   receiving an invocation request, wherein the invocation request is used to request to invoke the version code;
   sending a target token to the cloud, and receiving a verification result obtained by the cloud by verifying the target token; and
   when the verification result is that verification succeeds, allowing invocation of the version code.

4. The method according to claim 1, wherein after the receiving of the version code that is of the algorithm and that is returned by the cloud, the method further comprises:
   recording charging information of the version code, wherein the charging information comprises at least one of: a quantity of download times, a quantity of invocation times, or a quantity of forwarding times; and
   sending the charging information of the version code to the cloud, so that the cloud calculates a usage fee of the version code based on the charging information.

5. The method according to claim 1, wherein the capability description further comprises one or more of available storage space, available memory space.

6. The method according to claim 1, further comprising:
   running a program to test the floating-point operation capability of the client.

7. The method according to claim 5, further comprising:
   determining the available storage space by collecting statistics on used storage space and available storage space in real time.

8. The method according to claim 2, wherein the version description includes a release time of the algorithm.

9. A method comprising:
   receiving an algorithm identifier and a capability description that are sent by of a client;
   determining a version code of an algorithm based on the algorithm identifier, the capability description, and a target correspondence, wherein the target correspondence is a mapping relationship between the algorithm identifier, the capability description, and the version code; and
   returning the version code of the algorithm to the client.

10. The method according to claim 9, wherein before the determining of the version code of the algorithm based on the algorithm identifier, the capability description, and the target correspondence, the method further comprises:
    allocating the version code to a cloud node in a data amount balancing manner; or
    allocating the version code to a cloud node in an access traffic balancing manner.

11. The method according to claim 10, further comprising:
    determining, according to a deduplication algorithm, whether there is a duplicate version of the version code; and
    if there is a duplicate version, deleting the version code or the duplicate version.

12. The method according to claim 9, wherein after the returning of the version code of the algorithm to the client, the method further comprises:
    receiving charging information sent by the client, wherein the charging information comprises one or more of a quantity of download times, a quantity of invocation times, and a quantity of forwarding times; and
    calculating a usage fee of the version code based on the charging information.

13. The method according to claim 9, wherein the capability description comprises one or more of available storage space, available memory space, a floating-point operation capability, and a processor type.

14. A client, comprising a memory and a processor coupled to the memory, wherein the memory is configured to store program code, and the processor is configured to invoke the program code stored in the memory to perform a method comprising:
    obtaining an algorithm identifier of an algorithm and a capability description of a client;
    sending the algorithm identifier and the capability description to a cloud; and
    receiving a version code that is of the algorithm and that is returned by the cloud, wherein the version code is obtained by the cloud by searching based on the algorithm identifier and the capability description, wherein the capability description comprises one or more of a floating-point operation capability and a processor type.

15. A device, comprising: a memory and a processor coupled to the memory, wherein the memory is configured to store program code, and the processor is configured to invoke the program code stored in the memory to perform a method comprising:

receiving an algorithm identifier and a capability description of a client;

determining a version code of an algorithm based on the algorithm identifier, the capability description, and a target correspondence, wherein the target correspondence is a mapping relationship between the algorithm identifier, the capability description, and the version code; and returning the version code of the algorithm to the client.

* * * * *